United States Patent
Lee et al.

(10) Patent No.: US 9,460,330 B2
(45) Date of Patent: Oct. 4, 2016

(54) DISPLAY DEVICE AND METHOD OF CONTROLLING THEREFOR

(71) Applicant: LG ELECTRONICS INC., Seoul (KR)

(72) Inventors: Doyoung Lee, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 128 days.

(21) Appl. No.: 14/527,260

(22) Filed: Oct. 29, 2014

(65) Prior Publication Data

US 2016/0063297 A1  Mar. 3, 2016

(30) Foreign Application Priority Data

Sep. 2, 2014  (KR) .................. 10-2014-0116084

(51) Int. Cl.
*G06K 9/00* (2006.01)
*G07C 9/00* (2006.01)
*G06F 21/32* (2013.01)

(52) U.S. Cl.
CPC ........... *G06K 9/00013* (2013.01); *G06F 21/32* (2013.01); *G07C 9/00158* (2013.01); *G06F 2221/2147* (2013.01)

(58) Field of Classification Search
None
See application file for complete search history.

(56) References Cited

U.S. PATENT DOCUMENTS

| | | | |
|---|---|---|---|
| 7,109,967 B2 | 9/2006 | Hioki et al. | |
| 7,443,380 B2 | 10/2008 | Nozawa | |
| 7,880,718 B2 | 2/2011 | Cradick et al. | |
| 8,423,097 B2 | 4/2013 | Takagi | |
| 8,443,199 B2 | 5/2013 | Kim et al. | |
| 8,587,539 B2 | 11/2013 | Tziortzis et al. | |
| 9,043,900 B1* | 5/2015 | Kim | G06K 9/00013 455/565 |
| 9,047,453 B2* | 6/2015 | Huang | G06F 21/32 |
| 9,098,735 B2* | 8/2015 | Cho | G06K 9/00087 |
| 9,218,474 B1* | 12/2015 | Roth | G06F 21/32 |
| 2004/0008191 A1 | 1/2004 | Poupyrev et al. | |
| 2007/0247792 A1* | 10/2007 | Yang | G06F 1/1616 361/679.27 |
| 2007/0277126 A1 | 11/2007 | Park et al. | |
| 2008/0303782 A1 | 12/2008 | Grant et al. | |
| 2009/0219247 A1 | 9/2009 | Watanabe et al. | |
| 2010/0011291 A1 | 1/2010 | Nurmi | |
| 2010/0117975 A1 | 5/2010 | Cho | |
| 2010/0141605 A1 | 6/2010 | Kang et al. | |
| 2010/0231356 A1 | 9/2010 | Kim | |
| 2010/0240415 A1* | 9/2010 | Kim | G06F 3/03547 455/565 |

(Continued)

FOREIGN PATENT DOCUMENTS

| | | |
|---|---|---|
| KR | 10-2010-0101963 A | 9/2010 |
| KR | 10-2011-0092754 A | 8/2011 |

(Continued)

*Primary Examiner* — Chan Park
*Assistant Examiner* — Iman K Kholdebarin
(74) *Attorney, Agent, or Firm* — Birch, Stewart, Kolasch & Birch, LLP (57) ABSTRACT

A display device and a method of controlling therefor are disclosed. A display device includes a main display unit configured to receive an input of at least one fingerprint and display information, a sub display unit configured to be exposed from a stored position and a controller configured to set a mode based on the inputted at least one fingerprint. If an inputted first fingerprint is matched with a fingerprint of a group of registered fingerprints, the controller is configured to set a first mode. If an inputted first fingerprint and a second fingerprint are matched with fingerprints of the group of the registered fingerprints, the controller is configured to set a second mode.

18 Claims, 9 Drawing Sheets

(56) References Cited

U.S. PATENT DOCUMENTS

| | | | |
|---|---|---|---|
| 2011/0050975 A1* | 3/2011 | Chung | G06F 1/1624 348/333.02 |
| 2011/0057873 A1 | 3/2011 | Geissler et al. | |
| 2012/0112994 A1 | 5/2012 | Vertegaal et al. | |
| 2012/0169609 A1* | 7/2012 | Britton | G06F 3/0488 345/173 |
| 2012/0291121 A1* | 11/2012 | Huang | G06F 21/36 726/19 |
| 2013/0044240 A1 | 2/2013 | Leskela et al. | |
| 2013/0122866 A1* | 5/2013 | Huang | G06F 21/31 455/411 |
| 2013/0127606 A1 | 5/2013 | Chang | |
| 2013/0135182 A1 | 5/2013 | Jung et al. | |
| 2013/0145311 A1* | 6/2013 | Joo | G06F 3/04886 715/788 |
| 2013/0201115 A1 | 8/2013 | Heubel | |
| 2013/0324089 A1 | 12/2013 | Kim et al. | |
| 2014/0002402 A1 | 1/2014 | Kang et al. | |
| 2014/0035869 A1 | 2/2014 | Yun et al. | |
| 2014/0062976 A1* | 3/2014 | Park | G09G 5/00 345/204 |
| 2014/0068473 A1 | 3/2014 | Jano et al. | |
| 2015/0116086 A1* | 4/2015 | Kim | G06F 21/32 340/5.83 |
| 2015/0153777 A1* | 6/2015 | Liu | G06F 1/1652 345/173 |
| 2015/0324565 A1* | 11/2015 | Park | G06F 21/31 726/19 |

FOREIGN PATENT DOCUMENTS

| | | | |
|---|---|---|---|
| KR | 2015049550 A | * | 5/2015 |
| WO | WO-2014/042480 A1 | | 3/2014 |

\* cited by examiner

DISPLAY DEVICE AND METHOD OF CONTROLLING THEREFOR

This application claims the benefit of the Korean Patent Application No. 10-2014-0116084, filed on Sep. 2, 2014, which is hereby incorporated by reference as if fully set forth herein.

BACKGROUND OF THE INVENTION

1. Field of the Invention

The present specification relates to a display device and a method of controlling therefor.

2. Discussion of the Related Art

An electronic device including a fixed display unit is currently used. Yet, a study on various electronic devices is in progress and an electronic device including a display unit of various forms has been introduced. For instance, an electronic device including a new display unit such as an electronic device including a display unit of a curved form, an electronic device including a transparent display unit, an electronic device including a sub display unit and the like has been developed or is developing.

And, an electronic device can perform lots of functions and store huge amount of information. As an electronic device capable of being implemented by a display unit of various forms and performing various functions is developed, there may exist various using methods as well. For instance, there may exist a scheme of using an electronic device by a user alone, a scheme of using an electronic device to share information with others and the like.

Hence, it is necessary to perform a study on a security setting scheme and a security setting range according to various using methods.

SUMMARY OF THE INVENTION

Accordingly, the present specification is directed to an apparatus and method thereof that substantially obviate one or more problems due to limitations and disadvantages of the related art.

An object of the present specification is to provide a display device configuring a mode via fingerprint recognition and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a display device includes a main display unit configured to receive an input of at least one fingerprint and display information, a sub display unit configured to be exposed from a stored position and a controller configured to set a mode based on the inputted at least one fingerprint, the controller, if the at least one fingerprint includes a first fingerprint, configured to determine whether the first fingerprint is matched with a fingerprint of a group of registered fingerprints, the controller, if the first fingerprint is matched with the fingerprint of the group of the registered fingerprints, configured to set a first mode, the controller, if the at least one fingerprint includes both the first fingerprint and a second fingerprint, configured to determine whether the first fingerprint and the second fingerprint are matched with fingerprints of the group of the registered fingerprints, respectively, the controller, if the first fingerprint and the second fingerprint are matched with the fingerprints of the group of the registered fingerprints, respectively, configured to set a second mode.

And, the first mode and the second mode may correspond to a normal mode and a security mode, respectively.

Meanwhile, if the first fingerprint and the second fingerprint are matched with the fingerprints of the group of the registered fingerprints, respectively and the sub display unit is exposed from the stored position, the controller can set the second mode.

And, if the first fingerprint and the second fingerprint are matched with the fingerprints of the group of the registered fingerprints, respectively, a movement of the second fingerprint moving to a direction to which the sub display unit is exposed is detected on the main display unit, and the sub display unit is exposed from the stored position, the controller can set the second mode.

And, the main display unit can receive an input of the first fingerprint or the second fingerprint in a turn-off state.

And, if the sub display unit is exposed from the stored position, the controller can display an object displayed on the main display unit on the sub display unit.

Meanwhile, the object can include at least one selected from the group consisting of an application, content, user software, an icon, a folder and a widget.

And, a property of the object can include a security property indicating whether to display the object in the security mode.

And, if the display device is set to the security mode, the controller can hide an object to which the security property is set.

And, if the display device is set to the security mode, the controller can display a security mode indication on the main display unit.

And, when the sub display unit is exposed from the stored position, if a movement of the first fingerprint is detected on the main display unit, the controller can switch a mode.

And, if the mode is switched to the security mode from the normal mode, the controller can make an object to which the security property is set to be disappeared.

And, if the mode is switched to the normal mode from the security mode, the controller can make a hidden object to which the security property is set to be displayed.

Meanwhile, the sub display unit can be implemented by a rollable display form or a slide display form.

And, when the sub display unit is exposed, if external power applied to the sub display unit is disappeared, the sub display unit can be automatically stored.

To achieve these objects and other advantages and in accordance with the purpose of the invention, as embodied and broadly described herein, according to one embodiment, a method of controlling a display device including a main display unit and a sub display unit includes the steps of a fingerprint inputting step receiving an input of a first fingerprint via the main display unit configured to receive an input of at least one fingerprint and display information or receiving an input of a second fingerprint together with the first fingerprint, a fingerprint determining step, if the first fingerprint is received, determining whether the first fingerprint is matched with a fingerprint of a group of registered fingerprints, if the first fingerprint and the second fingerprint are inputted together, determining whether the first fingerprint and the second fingerprint are matched with fingerprints of the group of the registered fingerprints, respectively, and a mode setting step, if the first fingerprint is matched with the fingerprint of the group of the registered fingerprints, setting a first mode, if the first fingerprint and the second fingerprint are matched with the fingerprints of the group of the registered fingerprints, respectively, setting a second mode.

And, the first mode and the second mode may correspond to a normal mode and a security mode, respectively.

Meanwhile, if the first fingerprint and the second fingerprint are matched with the fingerprints of the group of the registered fingerprints, respectively and the sub display unit is exposed from a stored position, the mode setting step can set the second mode.

And, if the first fingerprint and the second fingerprint are matched with the fingerprints of the group of the registered fingerprints, respectively, a movement of the second fingerprint moving to a direction to which the sub display unit is exposed is detected on the main display unit, and the sub display unit is exposed from a stored position, the mode setting step can set the second mode.

And, if the sub display unit is exposed from a stored position, the method of controlling the display device can further include the step of displaying an object displayed on the main display unit on the sub display unit.

According to the aforementioned various embodiments, a display device and a method of controlling therefor can configure various modes according to a recognized fingerprint or a gesture.

And, a display device and a method of controlling therefor can display various objects according to a mode.

And, a display device and a method of controlling therefor can expose or store a display unit in various ways.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following description, preferred embodiments capable of concretely implementing the aforementioned object are explained with reference to attached drawings. In this case, composition and effect shown in the drawings and explained by the preferred embodiments are explained as at least one embodiment. A technical idea, a core composition and effect may be non-limited by the embodiment.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Figure 1:
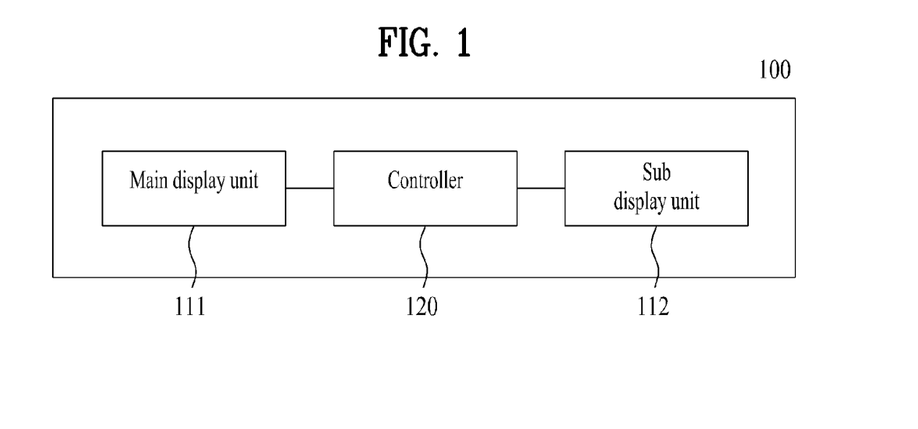
FIG. 1 is a block diagram for a display device according to one embodiment.

FIG. 1 is a block diagram for a display device according to one embodiment.

Referring to FIG. 1, a display device 100 can include a main display unit 111, a sub display unit 112 and a controller 120.

The main display unit 111 receives an input of at least one fingerprint and can display information. The main display unit 111 can include a fingerprint recognition layer configured to recognize a fingerprint and a touch recognition layer configured to recognize a touch gesture. The fingerprint recognition layer and the touch recognition layer can be formed with the main display unit 111 as one body. Or, the fingerprint recognition layer and the touch recognition layer can be arranged at a top part or a bottom part of the main display unit 111. A fingerprint contacted on the main display unit 111 can be inputted via the fingerprint recognition layer and a touch gesture contacted on the main display unit 111 can be inputted via the touch recognition layer.

The sub display unit 112 can be exposed from a stored position. The sub display unit 112 can be stored in the display device 100 or exposed to the external of the display device 100 in a manner of being arranged to one side of the display device 100. In case that the sub display unit 112 is stored in the display device 100, the display device can be used as similar as a general display device of which the main display unit 111 is exposed only. In case that the sub display unit 112 is exposed to the external of the display device 100, the display device can be used as a display device including an extended display unit. For instance, the sub display unit 112 can be implemented by a general display module, a flexible display module, a transparent display module or the like.

The controller 120 can configure a mode based on at least one inputted fingerprint. If the at least one inputted fingerprint includes a first fingerprint, the controller 120 determines whether the first fingerprint is matched with a fingerprint of a group of registered fingerprints. If the first fingerprint is matched with the fingerprint of the group of registered fingerprints, the controller can configure a first mode. In other word, if a fingerprint is inputted, the controller 120 can determine whether there is a fingerprint in the group of registered fingerprints matched with the inputted fingerprint. Since there exist a plurality of registered fingerprint information, the display device 100 can determine whether there is a matched fingerprint in the fingerprint group including a plurality of the fingerprint information. If the inputted fingerprint is matched with a registered first fingerprint, the controller can configure the first mode. The display device 100 may receive an input of plural number of fingerprints. Yet, if a single fingerprint among the inputted fingerprints is matched with a registered fingerprint only and the matched fingerprint corresponds to the first fingerprint, the controller can configure the first mode. In this case, a fingerprint means fingerprint information recognized by the main display unit 111 or registered fingerprint information.

If at least one inputted fingerprint includes both a first fingerprint and a second fingerprint, the controller 120 determines whether the first fingerprint and the second fingerprint are respectively matched with fingerprints of the group of registered fingerprints. If the first fingerprint and the second fingerprint are matched with the fingerprints of the group of registered fingerprints, respectively, the controller can configure a second mode. In other word, if a plurality of fingerprint information are inputted, the controller 120 can determine whether a plurality of the fingerprint information are matched with fingerprint information of the fingerprint group. If the inputted first fingerprint information and the second fingerprint information are matched with the registered fingerprint information, respectively, the controller can configure the second mode.

As one embodiment, the first mode and the second mode may correspond to a normal mode and a security mode, respectively. The normal mode indicates that the display device 100 is completely unlocked and the security mode indicates that the display device 100 is partially unlocked. Partial unlock of the display device means to unlock an application, content and the like only of which a display user 100 has permitted to open. Or, the partial unlock of the display device may mean not to unlock an application, content and the like to which security is set by the display user 100.

In the present specification, embodiment of the present specification is explained under an assumption that a first mode and a second mode correspond to a normal mode and a security mode, respectively. Yet, the display device 100 may configure the first mode as the security mode and configure the second mode as the normal mode as well. In this case, the display device 100 determines whether an inputted first fingerprint is matched with a fingerprint of a group of registered fingerprints. If the inputted first fingerprint is matched with the fingerprint of the group of registered fingerprints, the display device can configure the security mode. And, the display device 100 determines whether an inputted first fingerprint and a second fingerprint are respectively matched with fingerprints of the group of registered fingerprints. If the inputted first fingerprint and the second fingerprint are matched with the fingerprints of the group of registered fingerprints, respectively, the display device can configure the normal mode.

Figure 2:
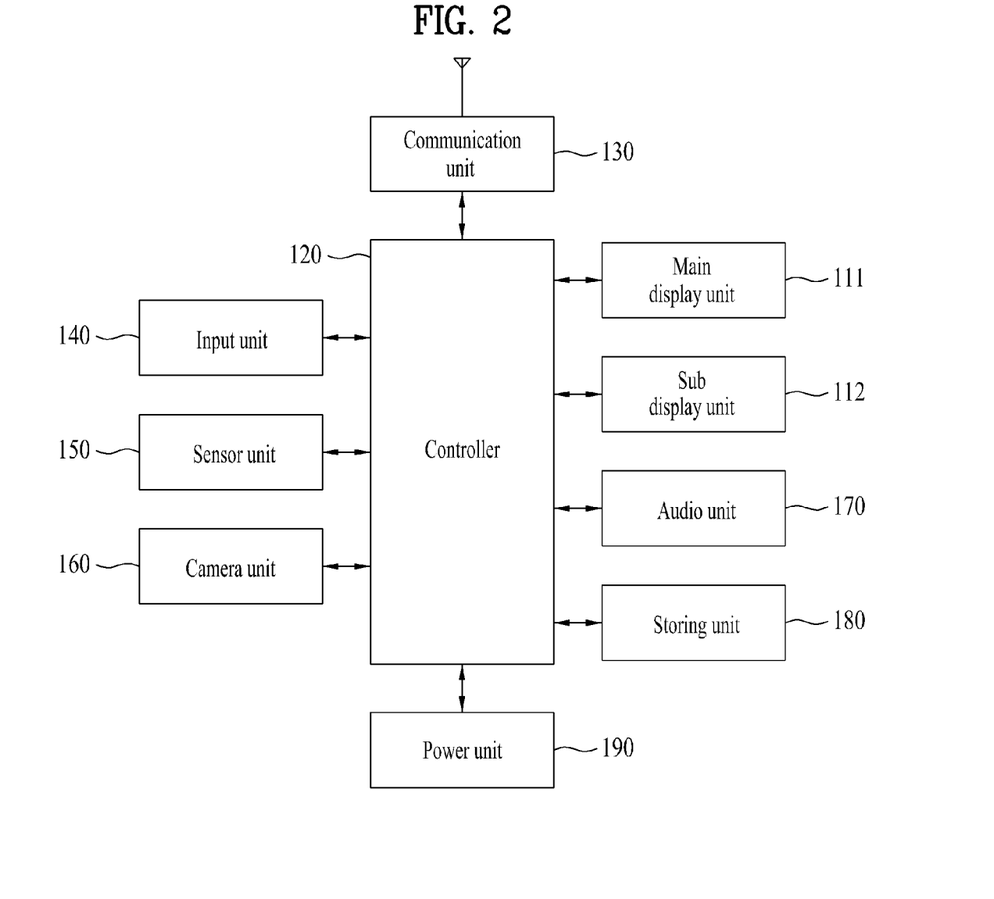
FIG. 2 is a block diagram for a display device according to a different embodiment.

FIG. 2 is a block diagram for a display device according to a different embodiment.

A display device 100 can include a main display unit 111, a sub display unit 112, a controller 120, a communication unit 130, an input unit 140, a sensor unit 150, a camera unit 160, an audio unit 170, a storing unit 180 and a power unit 190.

Since the main display unit 111, the sub display unit 112 and the controller 120 are similar to the main display unit 111, the sub display unit 112 and the controller 120 mentioned earlier with reference to FIG. 1, explanation on the main display unit 111, the sub display unit 112 and the controller 120 is omitted in FIG. 2.

The communication unit 130 performs a communication with the external using various protocols and can transceive data with the external. The communication unit 130 can transmit and receive digital data in a manner of accessing an external network in wired or wireless.

The input unit 140 can receive an input of a user command from the external. The input unit 140 can be implemented in various ways. For instance, the input unit 140 can be implemented by a keyboard, a keypad, a mouse, a touchpad, a button, a soft key or the like. In a broad sense, the input unit 140 can include a microphone, a touch screen and the like. The microphone can receive a voice input of a user and the touch screen can receive a touch gesture input of a user. In some cases, the microphone can be included in the audio unit 170 and the touch screen can be included in the main display unit 111 or the sub display unit 112.

The sensor unit 150 can deliver a user input or environment recognized by a device to the controller using a sensor installed in the device. The sensor unit can include a plurality of sensors. Examples of a plurality of the sensors may include a gravity sensor, a terrestrial magnetism sensor, a motion sensor, a gyro sensor, an acceleration sensor, an inclination sensor, an illumination sensor, an altitude sensor, a smell sensor, a temperature sensor, a depth sensor, a pressure sensor, a bending sensor, an audio sensor, a video sensor, a GPS sensor, a touch sensor and the like.

The display device can detect exposure or storing of the sub display 112 via the sensor unit 150.

The camera unit 160 can capture a picture and a video. The camera unit 160 can be used as a motion sensor or a video sensor. The camera unit 160 may include a plurality of cameras.

The audio unit 170 can include such an audio output means as a speaker and the like and such an audio input means as a microphone and the like. The audio unit 170 can be used as an audio sensor.

The storing unit 180 can store various digital data such as a video, an audio, a picture, a moving clip, an application and the like. Examples of the storing unit 180 may include a RAM, a ROM, a cache memory, a hard disc drive (HDD), a solid state drive (SSD), a CD, a DVD, a Blue-ray disc, a floppy disc (FDD), a magnetic disc, a memory card, a flash memory, a USB memory and the like.

The power unit 190 corresponds to a battery or a power source connected with an external power source. The power unit can supply power to the display device.

Meanwhile, the display device can be implemented in various forms. Examples of the display device may include a laptop computer, a monitor, a smartphone, a tablet PC, a navigator, a PMP, a kiosk and the like.

So far, a block diagram of the display device is explained in the foregoing description. In the following, various embodiments for the display device to configure a mode are explained.

Figure 3:
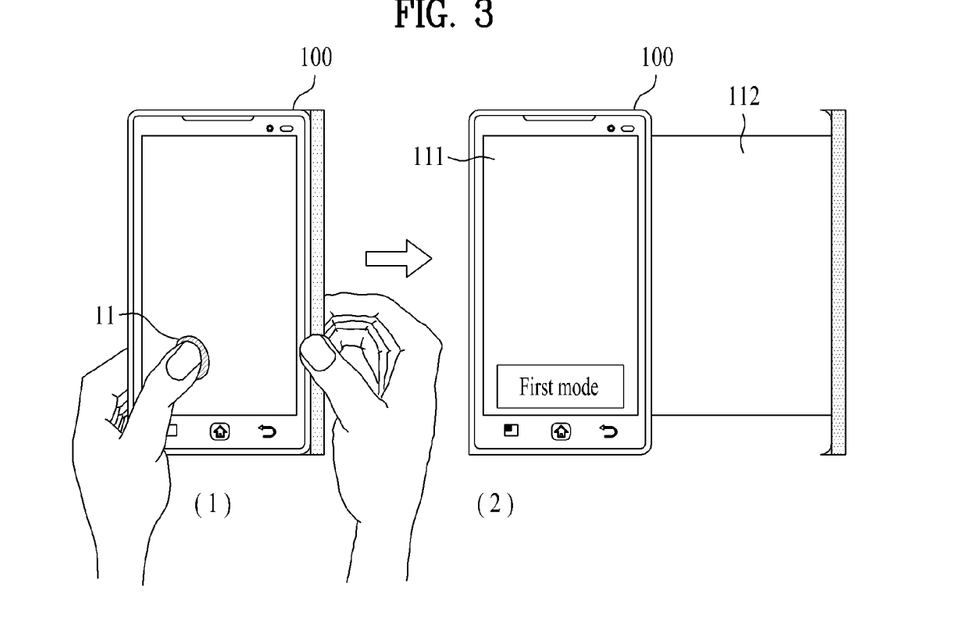
FIG. 3 is a diagram for explaining one embodiment configuring a first mode.

FIG. 3 is a diagram for explaining one embodiment configuring a first mode.

Referring to FIG. 3 (1), there is a display device 100 shown in the drawing. A sub display unit 112 of the display device 100 is stored in the display device 100. If a fingerprint 11 of a user is contacted with a main display unit 111, the display device 100 receives an input of the contacted fingerprint 11. In this case, the main display unit 111 may be in an off state. In FIG. 3 (1), a single fingerprint is contacted only. In particular, the user makes a single fingerprint to be contacted with the main display unit 11 and exposes the sub display unit 112.

Referring to FIG. 3 (2), there is the display device 100 of which the sub display unit 112 is exposed to the external. FIG. 3 (2) shows an embodiment that the sub display unit 112 is exposed from the left side of the display device 100. Yet, the sub display unit 112 can be exposed from one of the right side, the top side, the bottom side of the display device 100 as well.

The display device 100 can determine whether an inputted first fingerprint 11 is matched with a fingerprint of a group of registered fingerprints. If the inputted first fingerprint 11 is matched with a registered fingerprint, the display device 100 can configure a first mode. As mentioned in the foregoing description, the first mode may correspond to either a security mode or a normal mode. In the present specification, an embodiment that the first mode corresponds to the normal mode is explained.

The first mode shown in FIG. 3 (2) is just one embodiment. Although the display device 100 configures the first mode, the display device may not display such a mark as the first mode. In the first mode, the display device 100 can display content, an application, an icon and the like of which disclosure is approved.

Subsequently, embodiment of configuring a second mode is explained in the following. The second mode can be configured in various ways.

Figure 4:
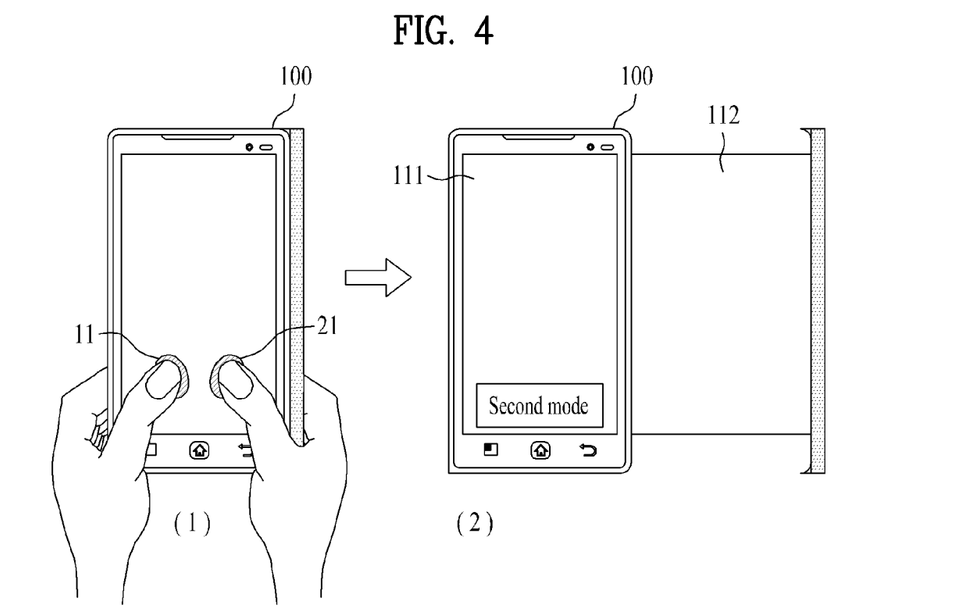
FIG. 4 is a diagram for explaining a first embodiment configuring a second mode.

FIG. 4 is a diagram for explaining a first embodiment configuring a second mode.

Referring to FIG. 4 (1), it shows a display device 100 in which a sub display unit 112 is stored. If fingerprints 11/21 of a user are contacted with a main display unit 111, the display device 100 receives inputs of the contacted first fingerprint 11 and the second fingerprint 21. In this case, the main display unit 111 may be in an off state. In other word, the main display unit 111 can receive the inputs of the first fingerprint 11 and the second fingerprint 21 in a turn-off state. The user makes the first fingerprint 11 and the second fingerprint 21 to be contacted with the main display unit 111 and then exposes the sub display unit 112.

Referring to FIG. 4 (2), it shows a display device 100 of which the sub display unit 112 is exposed to the external. The display device 100 can determine whether an inputted first fingerprint 11 and a second fingerprint are respectively matched with fingerprints of a group of registered fingerprints. If the inputted first fingerprint 11 and the second fingerprint 21 are matched with registered fingerprints, respectively, the display device 100 can configure a second mode. As mentioned in the foregoing description, an embodiment that the second mode corresponds to a security mode is explained in the present specification.

The main display unit 111 shown in FIG. 4 (2) displays the second mode. Although the display device 100 configures the second mode, the display device may not display such a mark as the second mode. In the second mode, the display device 100 can display content, an application, an icon and the like of which disclosure is approved. In other word, the display device 100 may not display content, an application, an icon and the like of which disclosure is not approved.

Meanwhile, among the inputted fingerprints 11/21, if the first fingerprint is matched only, the display device 100 can configure the first mode.

In a different embodiment configuring the second mode, the main display unit 111 can display a page identical to what is explained in FIG. 4 (2).

Figure 5:
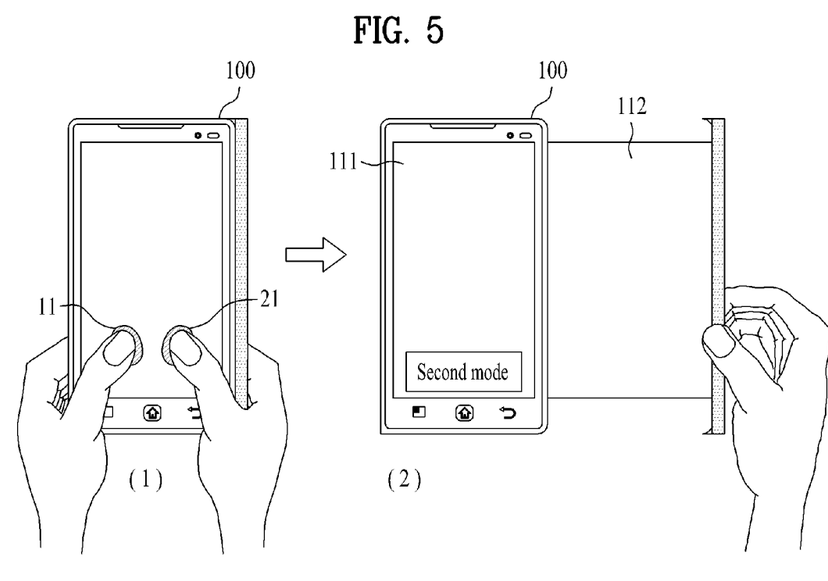
FIG. 5 is a diagram for explaining a second embodiment configuring a second mode.

FIG. 5 is a diagram for explaining a second embodiment configuring a second mode.

Referring to FIG. 5 (1), it shows a display device 100 in which a sub display 112 is stored. If fingerprints 11/21 of a user are contacted with a main display unit 111, the display device 100 receives inputs of the contacted first fingerprint 11 and the second fingerprint 21. In this case, the main display unit 111 may be in an off state. The user makes the first fingerprint 11 and the second fingerprint 21 to be contacted with the main display unit 111 and then exposes the sub display unit 112.

Referring to FIG. 5 (2), it shows a display device 100 of which a sub display unit 112 is exposed to the external. The display device 100 can determine whether an inputted first fingerprint 11 and a second fingerprint are respectively matched with fingerprints of a group of registered fingerprints. If the inputted first fingerprint 11 and the second fingerprint 21 are matched with registered fingerprints, respectively, and the sub display unit 112 is exposed to the external, the display device 100 can configure a second mode. In other word, if the inputted first fingerprint and the second fingerprint are matched with the fingerprints of the group of registered fingerprints, respectively and the sub display unit 112 is exposed from a stored position, the display device 100 can configure the second mode.

The display device 100 can detect exposure of the sub display unit 112 using a sensor. As an embodiment, the sensor can be installed in a handle part, which is held to expose the sub display unit 112, or one side of the display device 100 contacted with the handle part. In this case, if the sub display unit 112 is separated from the display device 100 or exposed more than a prescribed distance, the display device 100 can detect it as the sub display unit 112 is exposed. Or, although the sub display unit 112 is completely exposed, the sensor can be installed in a point situating inside of the display device 100. In this case, if a flexible display device 112 is completely exposed, the display device can detect it as the sub display unit 112 is exposed. Or, the sensor can be installed in a last part of the display device 100 in a direction to which the sub display unit 112 is exposed. In this case, if the flexible display device 112 is completely exposed, the display device can detect it as the sub display unit 112 is exposed.

According to the embodiment explained in FIG. 4, if the main display unit 111 receives the first fingerprint input and the second fingerprint input and if it is determined that the inputted fingerprints are matched with registered fingerprints, the second mode is configured. On the contrary, according to the embodiment explained in FIG. 5, if the inputted first fingerprint and the second fingerprint are matched with registered fingerprints and the sub display unit 112 is exposed, the second mode can be configured.

Figure 6:
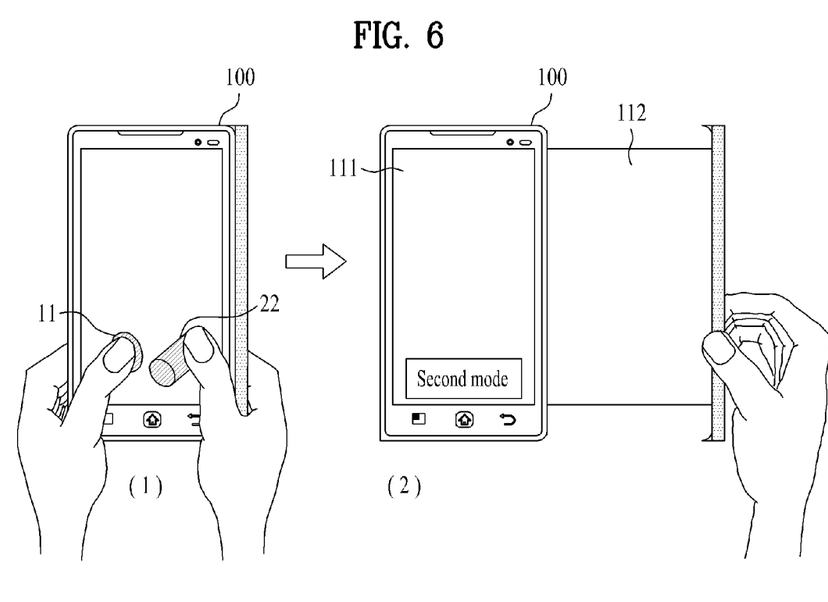
FIG. 6 is a diagram for explaining a third embodiment configuring a second mode.

FIG. 6 is a diagram for explaining a third embodiment configuring a second mode.

Referring to FIG. 6 (1), it shows a display device 100 in which a sub display unit 112 is stored. If fingerprints 11/22 of a user are contacted with a main display unit 111, the display device 100 receives a first fingerprint input 11 and a second fingerprint input 22. In this case, the main display unit 111 may be in an off state. Among the two fingerprints, the display device 100 can detect a gesture that the second fingerprint 22 is moving. The user makes the first fingerprint 11 and the second fingerprint 22 to be contacted with the main display unit 111, moves the second fingerprint 22 and then exposes the sub display unit 112.

Referring to FIG. 6 (2), it shows a display device 100 of which a sub display unit 112 is exposed to the external. The display device 100 can determine whether an inputted first fingerprint 11 and a second fingerprint 22 are respectively matched with fingerprints of a group of registered fingerprints. If the inputted first fingerprint 11 and the second fingerprint 22 are matched with the registered fingerprints, respectively, a movement of the second fingerprint 22 moving on the main display unit 111 is detected, and then the sub display unit 112 is exposed to the external, the display device 100 can configure a second mode. In other word, if the inputted first fingerprint 11 and the second fingerprint 22 are matched with the registered fingerprints, respectively, the second fingerprint, which is moving on the main display unit 111 in a direction to which the sub display unit 112 is exposed, is detected, and the sub display unit 112 is exposed from a stored position, the second mode can be configured.

As mentioned earlier in FIG. 5, the display device 100 can detect exposure of the sub display unit 112 using a sensor.

According to the embodiment explained in FIG. 5, if the inputted first and the second fingerprint are matched with registered fingerprints and the sub display unit is exposed, the second mode is configured. On the contrary, according to the embodiment explained in FIG. 6, if the inputted first fingerprint and the second fingerprint are matched with the registered fingerprints, the second fingerprint, which is moving on the main display unit in a direction to which the sub display unit 112 is exposed, is detected, and then the sub display unit is exposed, the second mode can be configured.

Figure 7:
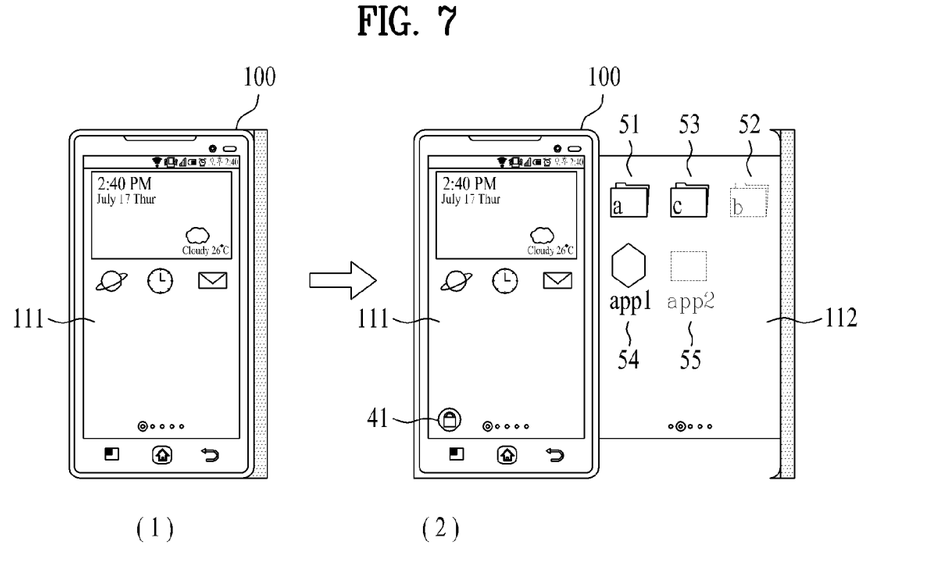
FIG. 7 is a diagram for explaining a display page on which a second mode is executed according to one embodiment.

FIG. 7 is a diagram for explaining a display page on which a second mode is executed according to one embodiment.

Referring to FIG. 7 (1), it shows a main display unit 111 on which icons are displayed. A page displayed on the main display unit 111 may correspond to a home page. As one embodiment, various indicators, a widget, an icon, an application and the like can be displayed on the home page. Among the various indicators, an indicator indicating an order of a currently displayed page out of total pages can be included in the home page. The home page shown in FIG. 7 (1) includes an indicator indicating that the home page corresponds to a first page.

Referring to FIG. 7 (2), it shows a display device 100 to which a security mode is set. According to the aforementioned various embodiments, the display device can be set to a second mode. In the present specification, an embodiment that the second mode corresponds to the security mode is explained. Yet, the display device 100 can also be implemented in a manner that the first mode corresponds to the security mode and the second mode corresponds to the normal mode.

If the security mode is configured and the sub display unit 112 is extended in a manner of being exposed, the display device 100 can display an object on the sub display unit 112. The object may include an application, content, user software, an icon, a folder, a widget and the like. The object may include a security property indicating whether to display the object in the security mode. Since the display device 100 is set to the security mode, a part of the object may not be displayed depending on a property. In particular, if the display device 100 is set to the security mode, the display device may hide objects to which a security property is set.

For instance, a folder 51, b folder 52, c folder 53 a first application 54 and a second application 55 can be displayed in a normal mode and the b folder 52 and the second application 55 may include the security property. In this case, the display device 100 may not display the b folder 52 and the second application 55 in which the security property is included. Hence, the display device 100 can display the a folder 51, the c folder 53 and the first application 54, which do not include the security property, on the sub display unit 112. In terms of a position, although the c folder 53 can be arranged after the b folder 52 in the normal mode, when the b folder 52 is not displayed in the security mode, the c folder 53 can be arranged after the a folder 51.

In case that the display device 100 is set to the security mode, the display device 100 can display a security mode indication on the main display unit 111. In particular, the main display unit 111 can display an indicator indicating that the display device is in the security mode. The indicator indicating that the display device is in the security mode may have a form of an icon or a text.

The main display unit 111 can display a first page among available total pages and the sub display unit 112 can display a second page among the available total pages. If the display device 100 receives an input of a page move gesture, the display device 100 can move a display page in one-page unit or two-page unit. For instance, if the display device 100 is configured to move a display page in one-page unit, the main display unit 111 and the sub display unit 112 can display a second page and a third page, respectively according to the input of the page move gesture. On the contrary, if the display device 100 is configured to move the display page in two-page unit, the main display unit 111 and the sub display unit 112 can display the third page and a fourth page, respectively according to the input of the page move gesture.

Figure 8:
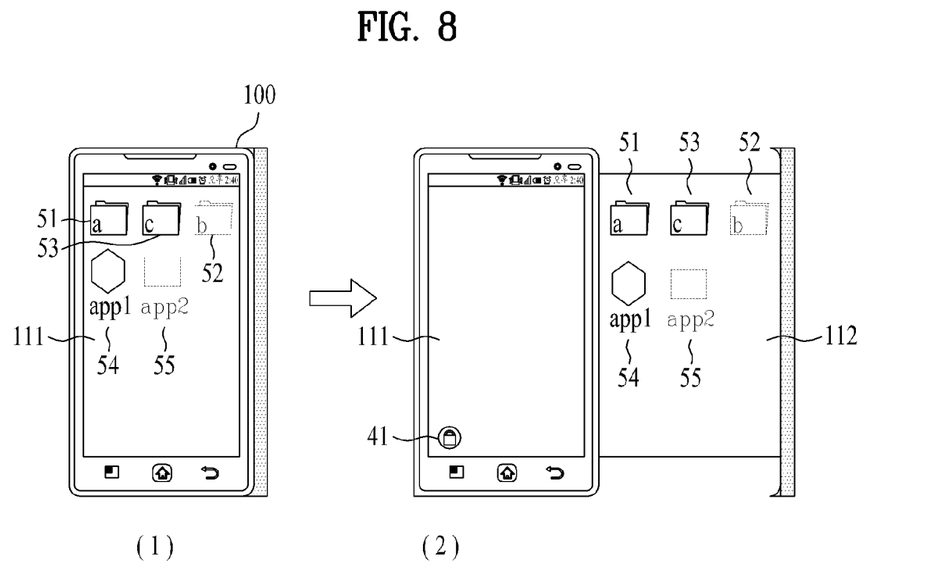
FIG. 8 is a diagram for explaining a display page on which a second mode is executed according to a different embodiment.

FIG. 8 is a diagram for explaining a display page on which a second mode is executed according to a different embodiment.

Referring to FIG. 8 (1), it shows a main display unit 111 on which folders are displayed. As one embodiment, various indicators, a widget, an icon, a folder, an application and the like can be displayed on the main display unit 111. If the display device 100 is in a state of a security mode, objects including a security property may not be displayed. For instance, a folder 51, c folder 53 and a first application 54, which do not include the security property, can be displayed on the main display unit. On the other hand, b folder 52, and a second application 55, which do not include the security property, may not be displayed on the main display unit. The security mode is set to the display device 100 shown in FIG. 8 (1) in a state that the sub display unit 112 is stored in the display device. As mentioned in the foregoing description, when the second mode corresponds to the security mode, if the first fingerprint and the second fingerprint are matched with registered fingerprints, respectively, the second mode can be configured. In this case, the display device 100 can configure the security mode while the sub display unit 112 is stored in the display device. Or, the first mode may correspond to the security mode as well.

Referring to FIG. 8 (2), it shows a display device 100 of which a sub display device 112 is extended in a manner of being exposed. If the sub display unit 112 is exposed and extended, the display device 100 can display objects displayed on the main display unit 111 on the sub display unit. The objects displayed on the main display unit 111 can be displayed on the sub display unit 112 in a manner of being moved to the sub display unit. In other word, if the sub display unit 112 is exposed from a stored position, the display device 100 can display the objects displayed on the main display unit 111 on the sub display unit 112.

Since the display device 100 is in the security mode, b folder 52 and a second application 55, which include a security property, are not displayed. Hence, the display device 100 can display a folder 51, c folder 53 and a first application 54, which do not include the security property, on the sub display unit 112. In terms of a position, although the c folder 53 can be arranged after the b folder 52 in the normal mode, when the b folder 52 is not displayed in the security mode, the c folder 53 can be arranged after the a folder 51.

The main display unit 111 can display an indicator indicating that the display device is in the security mode. The indicator indicating that the display device is in the security mode may have a form of an icon or a text.

The display device 100 can change a currently set mode using a touch gesture.

Figure 9:
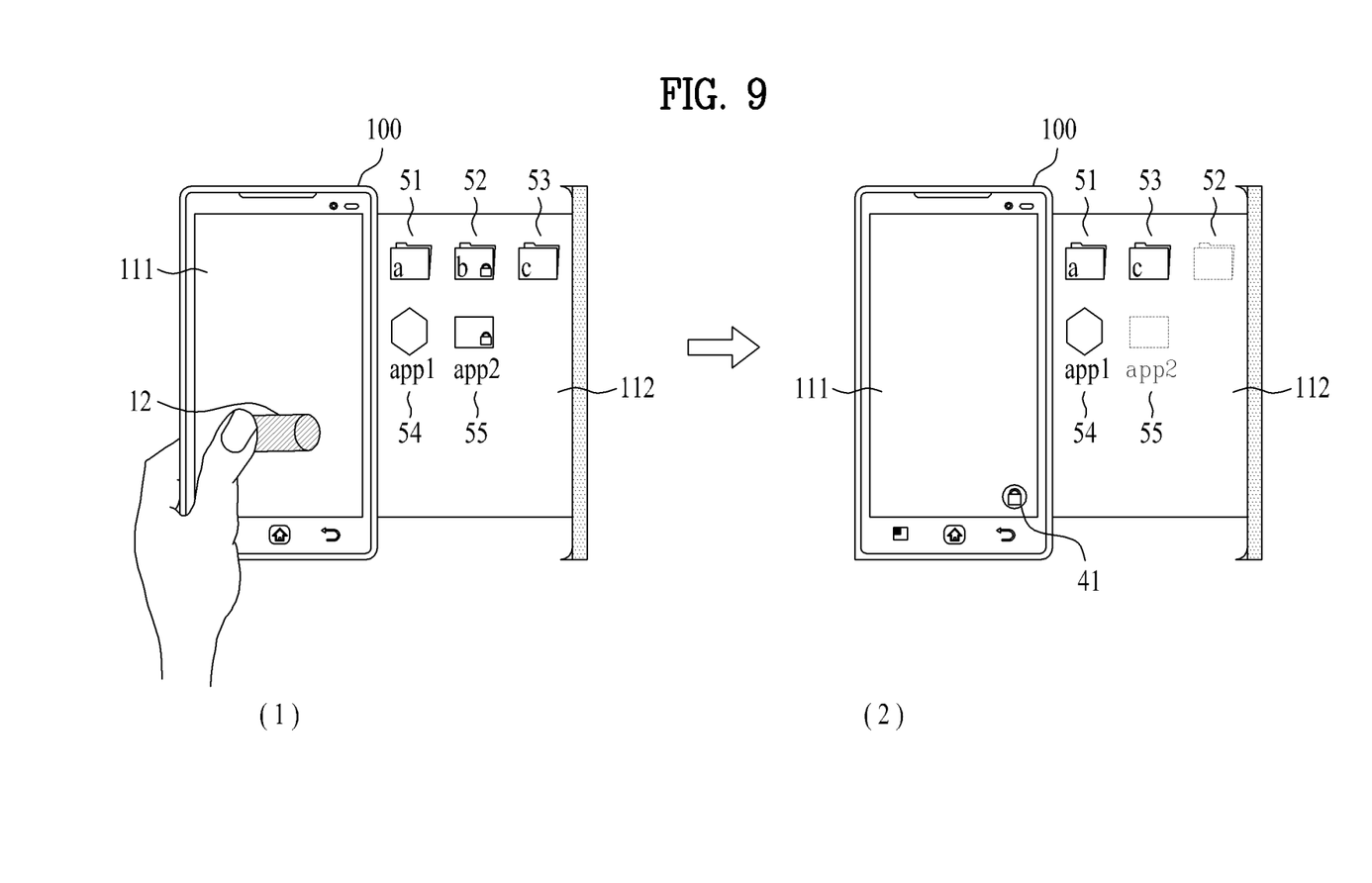
FIG. 9 is a diagram for explaining one embodiment switching to a security mode.

FIG. 9 is a diagram for explaining one embodiment switching to a security mode.

Referring to FIG. 9 (1), it shows a display device 100 set to a normal mode. A sub display unit 112 is exposed to the external and objects are displayed on the sub display unit 112. As an embodiment, the sub display unit 112 can display a folder 51, b folder 52, c folder 53, a first application 54 and a second application 55. The b folder 52 and the second application 55 include a security property. Yet, since the display device 100 is set to the normal mode, the b folder 52 and the second application 55, which include the security property, can be displayed as well. As an embodiment, the b folder 52 and the second application 55, which include the security property, can display a security property indicator. As an embodiment, the security property indicator can be displayed on a part of a folder or an icon as an image of a lock shape or a text.

The display device 100 can detect a gesture 12 of a user fingerprint moving on the main display unit 111. As an embodiment, when the sub display unit 112 is exposed from a stored position, if a movement of a first fingerprint is detected on the main display unit 111, the display device 100 can switch a mode. The movement of the first fingerprint switching the mode may correspond to a rub gesture. And, the display device 100 can switch the mode when the first fingerprint moves to a direction opposite to a position at which the sub display unit 112 is positioned.

Referring to FIG. 9 (2), it shows a display device 100 switched to a security mode. If the display device 100 switches to the security mode from a normal mode, it may make objects to which a security property is set to be disappeared. In other word, if a mode is switched to the security mode, the display device 100 can hide b folder 52 and a second application 55 that include the security property. Hence, a sub display unit 112 can display a folder 51, c folder 53 and a first application 54 that does not include the security property.

If a mode of the display device 100 is switched to the security mode, the display device 100 can display an indicator 41 indicating the security mode. The indicator 41 indicating the security mode may correspond to either an image or a text. And, the indicator 41 indicating the security mode can be displayed on the main display unit 111 or the sub display unit 112.

Figure 10:
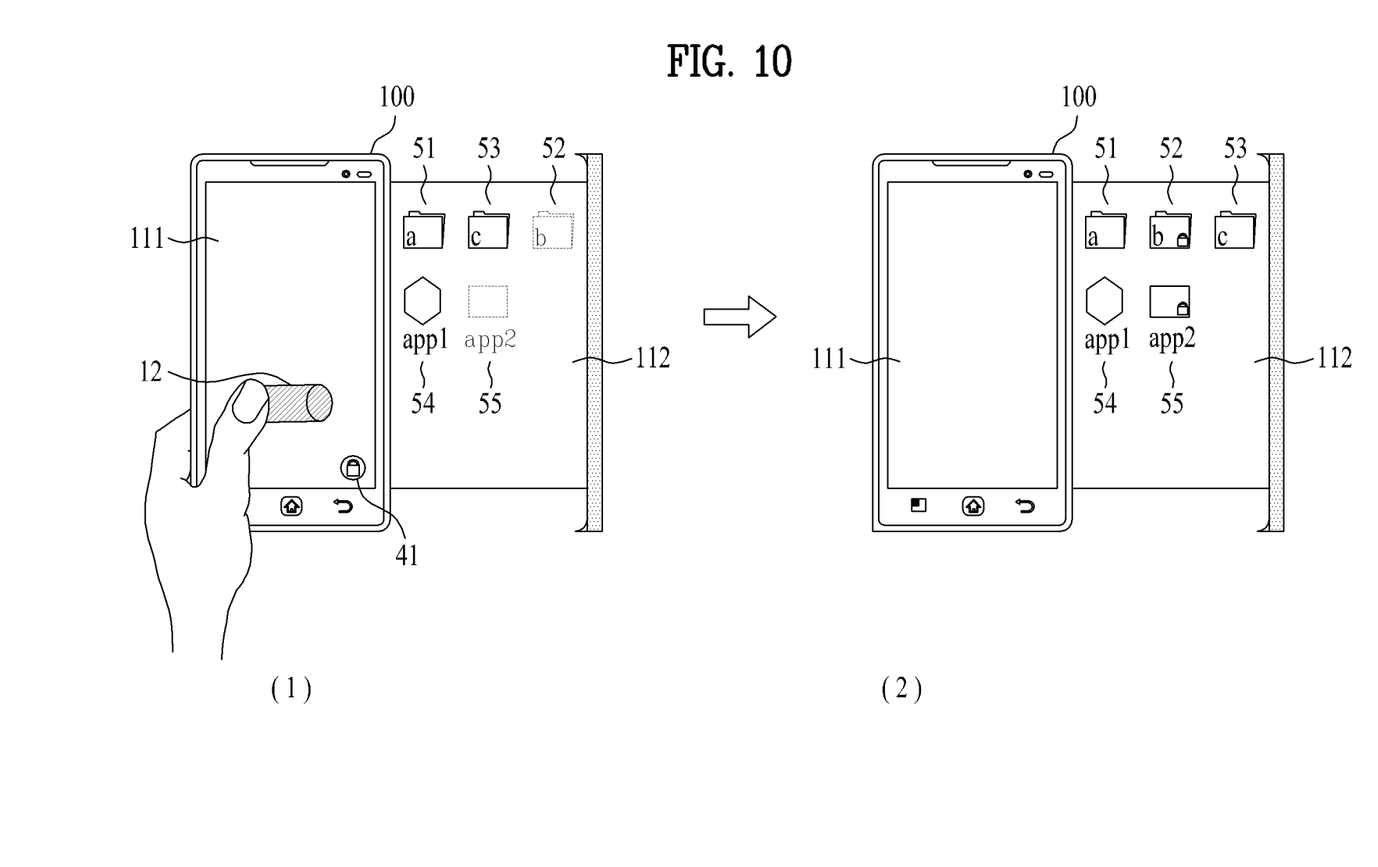
FIG. 10 is a diagram for explaining one embodiment switching to a normal mode.

FIG. 10 is a diagram for explaining one embodiment switching to a normal mode.

Referring to FIG. 10 (1), it shows a display device 100 set to a security mode. A sub display unit 112 is exposed and objects are displayed on the sub display unit 112. As an embodiment, the sub display unit 112 can display a folder 51, c folder 53 and a first application 54 that do not include a security property. Since b folder 52 and a second application 55 include the security property, the b folder and the second application may not be displayed. The display device 100 can display an indicator 41 indicating the security mode. The indicator 41 indicating the security mode can be displayed on a main display unit 111 or the sub display unit 112.

The display device 100 can detect a gesture of a user fingerprint moving on the main display unit 111. As an embodiment, when the sub display unit 112 is exposed from a stored position, if a movement of a first fingerprint is detected on the main display unit 111, the display device 100 can switch a mode.

Referring to FIG. 10 (2), it shows a display device 100 switched to a normal mode. In case that the display device 100 switches to the normal mode from a security mode, hidden objects to which a security property is set can be displayed. In other word, if a mode of the display device 100 is switched to the normal mode, the display device 100 can display b folder 52 and a second application 55 that include the security property. Hence, a sub display unit 112 can display a folder 51, the b folder 52, c folder 53, a first application 54 and the second application 55. As an embodiment, the b folder 52 and the second application 55 that include the security property can display a security property indicator. As an embodiment, the security property indicator can be displayed on a part of a folder or an icon as an image of a lock shape or a text.

The display device 100 can switch a mode in a manner of detecting a user fingerprint moving on the main display unit 111. The sub display unit 112 can be stored or exposed. In the following, a structure of the sub display unit 112 is explained.

Figure 11:
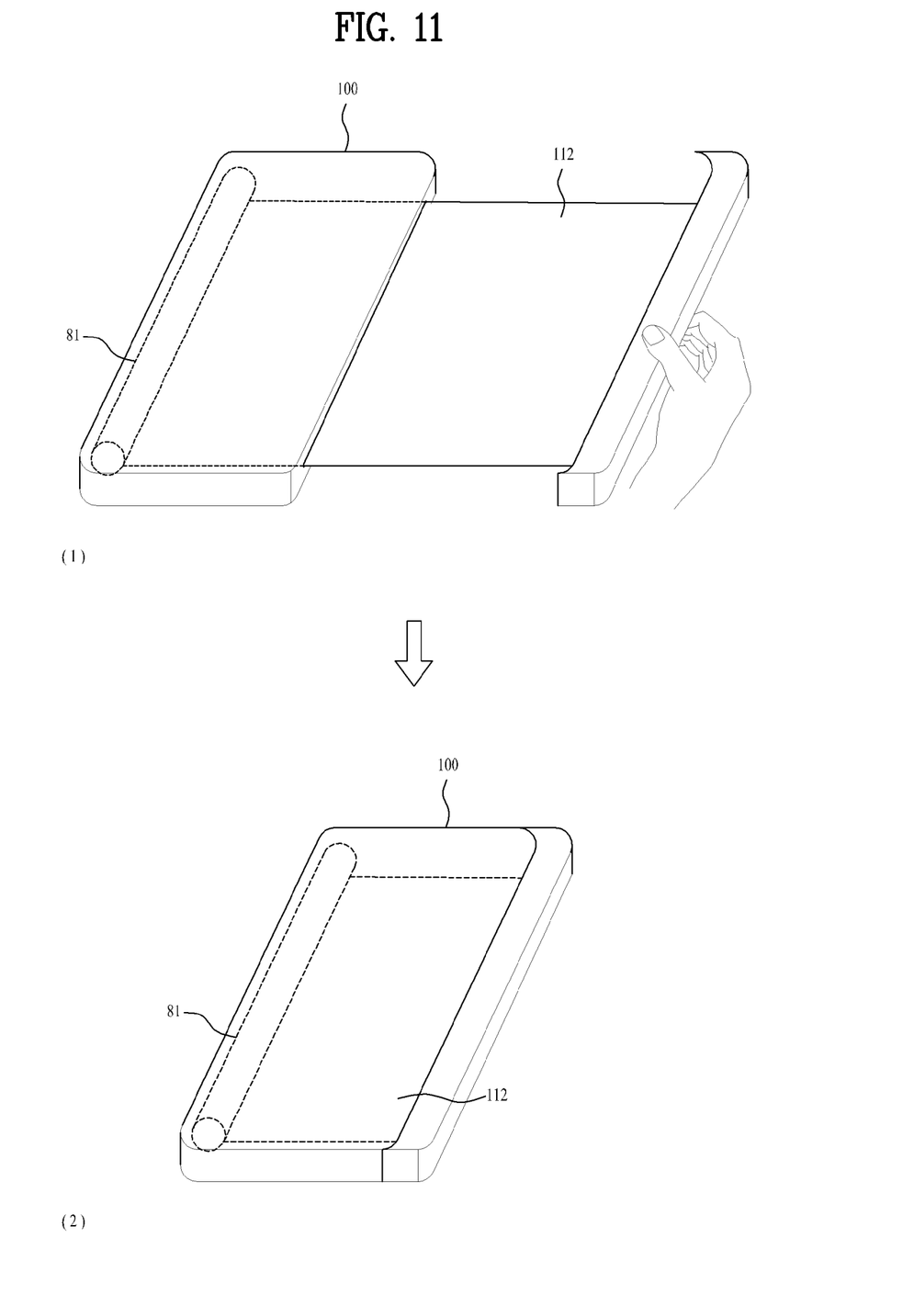
FIG. 11 is a diagram for explaining one embodiment of a display unit storing scheme.

FIG. 11 is a diagram for explaining one embodiment of a display unit storing scheme.

Referring to FIG. 11 (1), it shows an exposed sub display unit 112. The sub display unit 112 can be stored in a display device 100. As an embodiment, the sub display unit 112 can be implemented by a flexible display module. The display device 100 may include a roller 81 in a position opposite to a position where the sub display unit 112 is in and out. A part of the sub display unit 112 can exist in a state of being rolled by the roller 81. The roller 81 may have a prescribed resilience. For instance, the roller 81 may have a resilience intending to wind back to an original direction in a manner of being connected with an element having elastic force such as a spring and a rubber band when an external power disappears. The sub display unit 112 can be exposed to the external due to pulling power of a user. The roller 81 may rotate in a direction opposite to a direction in which the sub display unit 112 is rolled due to the pulling power of the user and the sub display unit 112 can be unrolled.

Referring to FIG. 11 (2), it shows a stored sub display unit 112. A user may release the sub display unit 112. Pulling power used to be applied to the sub display unit 112 is disappeared. The sub display unit 112 is connected with a roller 81 and the roller 81 may have resilience. Hence, with the help of the resilience of the roller 81, the sub display unit 112 can be automatically rolled. In particular, the sub display unit 112 can be implemented in a rollable display form. When the sub display device is exposed, if external power applied to the sub display unit is disappeared, the sub display unit can be automatically stored in the display device 100.

Figure 12:
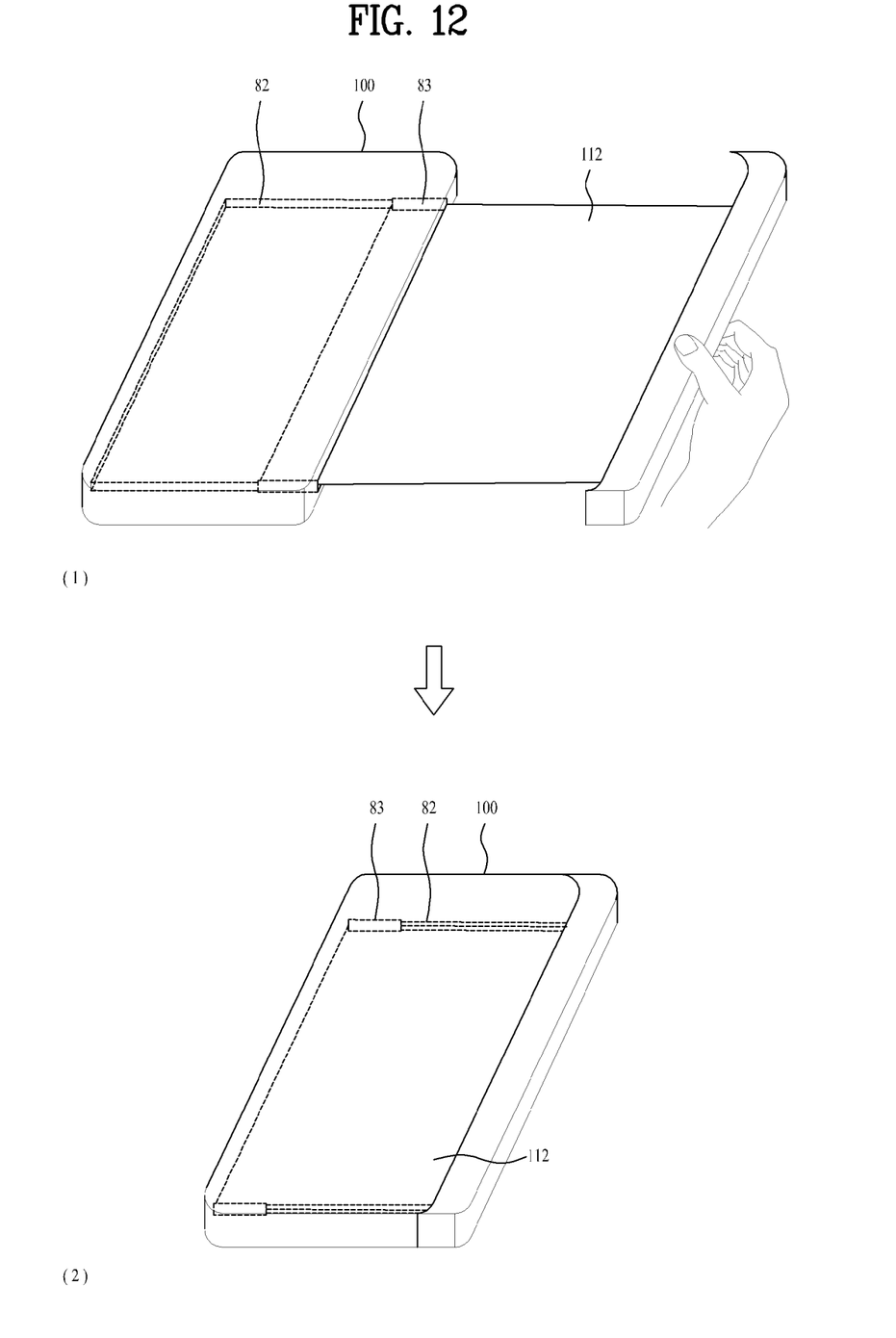
FIG. 12 is a diagram for explaining a different embodiment of a display unit storing scheme.

FIG. 12 is a diagram for explaining a different embodiment of a display unit storing scheme.

Referring to FIG. 12 (1), it shows an exposed sub display unit 112. As an embodiment, the sub display unit 112 can be implemented by a flexible display module, a transparent display module, a normal display module and the like. A display device 100 can include a slide unit. The slide unit can include a slide lane 82 and a slider 83. Or, the slide unit can be implemented by an inner slider and an external slider making a pair. As an embodiment, the display device 100 installs the slide lane 82 in the inside of the display device and can install the slider 83 moving according to the slide lane 82. The slider 83 can be connected with the sub display unit 112. The sub display unit 112 can be exposed to the external in a manner of receiving power pulling from the external. The slider 83 connected with the sub display unit 112 may move according to the slide lane 82.

Referring to FIG. 12 (2), it shows a stored sub display unit 112. A slider 83 can be connected with an additional element. If there is no element in the slider 83, the sub display unit 122 can be manually stored by a pushing power. As an embodiment, the slider 83 may have a resilience intending to wind back to an original direction in a manner of being connected with an element having elastic force such as a spring and a rubber band when an external power disappears. A user may release the sub display unit 112. Pulling power applied to the sub display unit 112 is disappeared. The sub display unit 112 is connected with the slider 83 and the slider 83 may have resilience. Hence, with the help of the resilience of the slider 83, the sub display unit 112 can be automatically rolled. In particular, the sub display unit 112 can be implemented in a slide display form. When the sub display unit is exposed, if external power applied to the sub display unit is disappeared, the sub display unit can be automatically stored in the display device 100.

Figure 13:
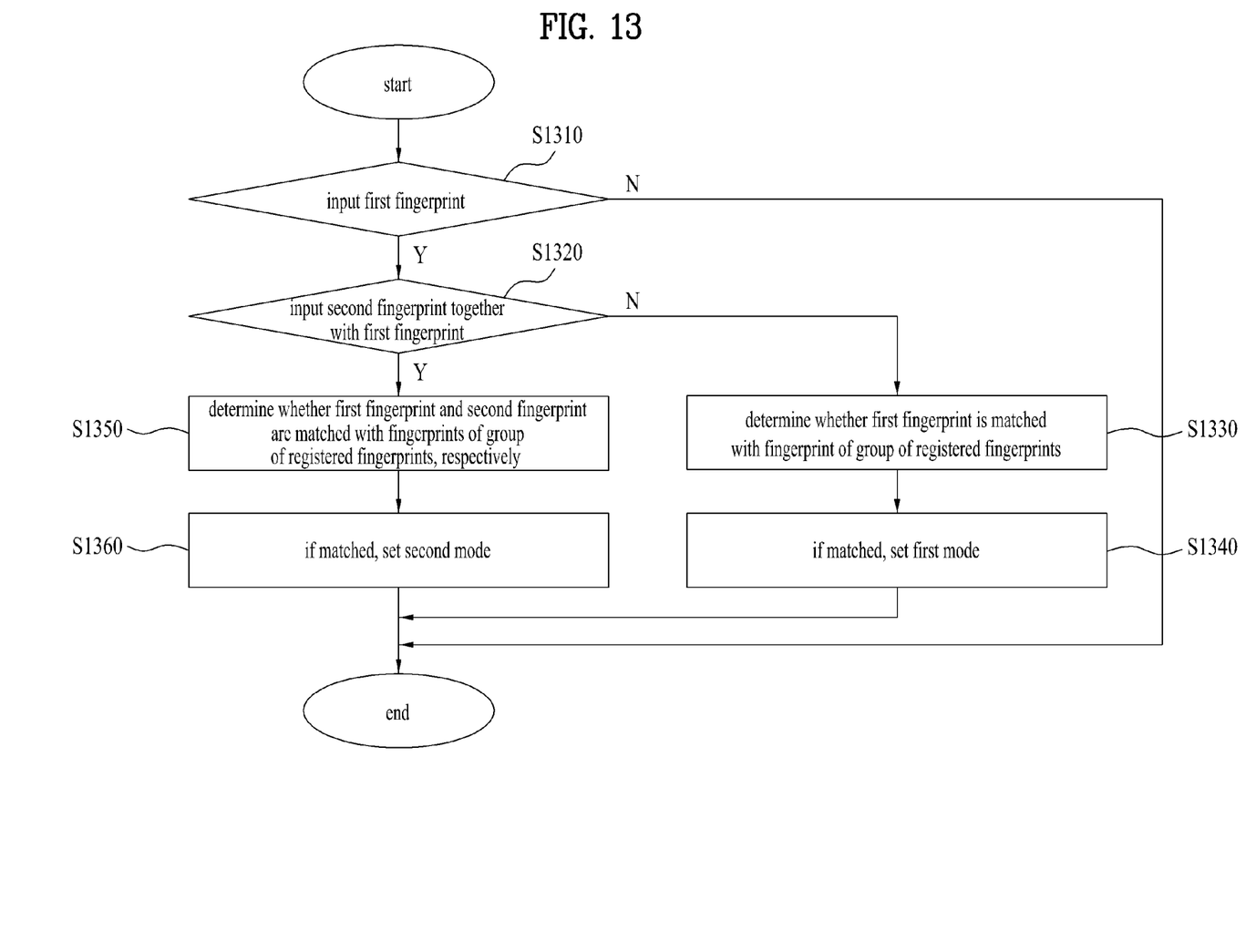
FIG. 13 is a flowchart for a method of controlling a display device according to one embodiment.

FIG. 13 is a flowchart for a method of controlling a display device according to one embodiment.

Referring to FIG. 13, a display device including a main display unit and a sub display unit can determine whether a first fingerprint is inputted via the main display unit [S1310]. If the first fingerprint is not inputted, the display device can terminate a fingerprint detecting process. If the first fingerprint is inputted, the display device can determine whether a second fingerprint is inputted together with the first fingerprint [S1320]. In particular, the display device receives at least one fingerprint input. The display device receives the first fingerprint input via the main display unit displaying information or may be able to receive the second fingerprint input together with the first fingerprint input.

If it is determined that the second fingerprint is not inputted, the display device can determine whether the first fingerprint is matched with a fingerprint of a group of registered fingerprints [S1330]. If the inputted first fingerprint is matched with a registered fingerprint, the display device can configure a first mode [S1340].

Meanwhile, if it is determined that the second fingerprint is inputted together with the first fingerprint, the display device can determine whether the first fingerprint and the second fingerprint are matched with fingerprints of the group of registered fingerprints, respectively [S1350]. If the inputted first fingerprint and the second fingerprint are matched with the registered fingerprints, respectively, the display device can configure a second mode [S1360]. As an embodiment, the first mode and the second mode can be configured as a normal mode and a security mode, respectively. Yet, the first and the second mode can be reversely configured as well.

Meanwhile, the second mode can be configured in various ways. As an embodiment, if the first fingerprint and the second fingerprint are matched with the registered fingerprints, respectively and the sub display unit is exposed from a stored position, the display device can configure the second mode. As a different embodiment, if first fingerprint and the second fingerprint are matched with the registered fingerprints, respectively, a movement of the second fingerprint moving to a direction to which the sub display unit is exposed is detected on the main display unit, and the sub display unit is exposed from the stored position, the display device can configure the second mode.

If the sub display unit is exposed from the stored position, the display device can display a page corresponding to a next page of a page displayed on the main display unit. Or, the display device may display an object displayed on the main display unit on the sub display unit.

A display device and a method of controlling therefor according to the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a method of controlling a display device according to the present specification can be implemented with a software readable by a processor in a recording media readable by the processor, which is equipped in the display device. The recording media readable by the processor may include all kinds of recording devices for storing data capable of being read by the processor. The examples of the recording media readable by the processor may include a ROM, a RAM, a CD-ROM, a magnetic tape, a floppy disc, an optical data storing device and the like. And, to implement in a form of a carrier wave such as a transmission via the internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A display device, comprising:
    a main display configured to receive an input of at least one fingerprint and display information;
    a sub-display configured to be exposed from a stored position; and
    a controller configured to set a mode based on the inputted at least one fingerprint, wherein the controller is further configured to:
    if the at least one fingerprint contains a first fingerprint, determine whether the first fingerprint is matched with a fingerprint of a group of registered fingerprints,
    if the first fingerprint is matched with the fingerprint of the group of the registered fingerprints, set a first mode,
    if the at least one fingerprint contains both the first fingerprint and a second fingerprint, determine whether the first fingerprint and the second fingerprint are matched with fingerprints of the group of the registered fingerprints, respectively, and if the first fingerprint and the second fingerprint are matched with the fingerprints of the group of the registered fingerprints, respectively, set a second mode,
wherein if the first fingerprint and the second fingerprint are matched with the fingerprints of the group of the registered fingerprints, respectively, a movement of the second fingerprint moving to a direction to which the sub-display is exposed is detected on the main display, and the sub-display is exposed from the stored position, the controller is further configured to set the second mode.

2. The display device of claim 1, wherein the first mode and the second mode correspond to a normal mode and a security mode, respectively.

3. The display device of claim 1, wherein if the first fingerprint and the second fingerprint are matched with the fingerprints of the group of the registered fingerprints, respectively and the sub-display is exposed from the stored position, the controller is further configured to set the second mode.

4. The display device of claim 1, wherein the main display unit display is further configured to receive an input of the first fingerprint or the second fingerprint in a turn-off state.

5. The display device of claim 2, wherein if the sub-display is exposed from the stored position, the controller is further configured to display an object displayed on the main display on the sub-display.

6. The display device of claim 5, wherein the object is at least one of an application, content, a user software, an icon, a folder and a widget.

7. The display device of claim 5, wherein a property of the object comprises a security property indicating whether to display the object in the security mode.

8. The display device of claim 7, wherein if the display device is set to the security mode, the controller is further configured to hide an object to which the security property is set.

9. The display device of claim 7, wherein if the display device is set to the security mode, the controller is further configured to display a security mode indication on the main display.

10. The display device of claim 7, wherein when the sub-display is exposed from the stored position, if a movement of the first fingerprint is detected on the main display, the controller is further configured to switch a mode.

11. The display device of claim 10, wherein if the mode is switched to the security mode from the normal mode, the controller is further configured to make an object to which the security property is set to be disappeared.

12. The display device of claim 10, wherein if the mode is switched to the normal mode from the security mode, the controller is further configured to make a hidden object to which the security property is set to be displayed.

13. The display device of claim 1, wherein the sub-display is a rollable display type or a slide display type.

14. The display device of claim 1, wherein when the sub-display is exposed, if external power applied to the sub-display is disappeared, the sub-display is further configured to be automatically stored.

15. A method of controlling a display device containing a main display configured to receive an input of at least one fingerprint and display information and a sub-display configured to be exposed from a stored position, the method comprising:
setting, via a controller of the display device, a mode based on the inputted at least one fingerprint;
if the at least one fingerprint contains a first fingerprint, determining, via the controller, whether the first fingerprint is matched with a fingerprint of a group of registered fingerprints;
if the first fingerprint is matched with the fingerprint of the group of the registered fingerprints, setting, via the controller, a first mode;
if the at least one fingerprint contains both the first fingerprint and a second fingerprint, determining, via the controller, whether the first fingerprint and the second fingerprint are matched with fingerprints of the group of the registered fingerprints, respectively; and
if the first fingerprint and the second fingerprint are matched with the fingerprints of the group of the registered fingerprints, respectively, setting, via the controller, a second mode,
wherein if the first fingerprint and the second fingerprint are matched with the fingerprints of the group of the registered fingerprints, respectively, a movement of the second fingerprint moving to a direction to which the sub-display is exposed is detected on the main display, and the sub-display is exposed from the stored position, the controller is further configured to set the second mode.

16. The method of claim 15, wherein the first mode and the second mode correspond to a normal mode and a security mode, respectively.

17. The method of claim 15, wherein if the first fingerprint and the second fingerprint are matched with the fingerprints of the group of the registered fingerprints, respectively and the sub-display is exposed from a stored position, the second mode is set.

18. The method of claim 15, if the sub-display is exposed from a stored position, the method further comprises displaying an object displayed on the main display on the sub-display.

* * * * *